US006234306B1

(12) United States Patent
Gloger et al.

(10) Patent No.: US 6,234,306 B1
(45) Date of Patent: May 22, 2001

(54) DEVICE FOR STORING AUDIO MEDIA AND/OR DISK-SHAPED DATA MEDIA

(75) Inventors: Klaus W. J. Gloger; Heinz-Ulrich Diestelhorst, both of Bunde (DE)

(73) Assignee: Variopac Swiss GmbH (DE)

( * ) Notice: Subject to any disclaimer, the term of this patent is extended or adjusted under 35 U.S.C. 154(b) by 0 days.

(21) Appl. No.: 09/462,213

(22) PCT Filed: Jul. 3, 1998

(86) PCT No.: PCT/EP98/04136

§ 371 Date: Feb. 25, 2000

§ 102(e) Date: Feb. 25, 2000

(87) PCT Pub. No.: WO99/01869

PCT Pub. Date: Jan. 14, 1999

(30) Foreign Application Priority Data

Jul. 4, 1997 (DE) .............................................. 197 28 705

(51) Int. Cl.⁷ .................................................. B65D 85/57
(52) U.S. Cl. ..................... 206/308.1; 312/9.16; 312/9.17
(58) Field of Search ................................ 206/308.1, 309; 312/9.16, 9.17, 9.23, 9.47, 9.48, 9.53

(56) References Cited

U.S. PATENT DOCUMENTS

| | | | |
|---|---|---|---|
| 3,969,007 | 7/1976 | Lowry | 312/15 |
| 4,640,415 | 2/1987 | Ackeret | 206/387 |
| 4,664,454 | 5/1987 | Schatteman et al. | 312/13 |
| 4,699,268 | 10/1987 | Oishi | 206/313 |
| 4,702,533 | 10/1987 | Seifert | 312/12 |
| 4,763,962 | 8/1988 | Ackeret | 312/16 |
| 4,863,031 | 9/1989 | Tanaka et al. | 206/444 |
| 4,964,510 | 10/1990 | Loyd | 206/306 |
| 5,346,295 | 9/1994 | Richter | 312/9.12 |
| 5,425,450 | 6/1995 | Lin | 206/310 |
| 5,944,180 | * 8/1999 | Koh et al. | 206/308.1 |

FOREIGN PATENT DOCUMENTS

| | | |
|---|---|---|
| 31992/84 | 3/1985 | (AU) . |
| 32279/84 | 3/1985 | (AU) . |
| 32447/84 | 3/1985 | (AU) . |
| 42404/85 | 11/1985 | (AU) . |
| 46017/85 | 2/1986 | (AU) . |
| 2 307 410 | 8/1974 | (DE) . |
| 30 08 513 A1 | 9/1981 | (DE) . |
| 92 05 830 | 8/1992 | (DE) . |
| 0 181 835 A2 | 5/1986 | (EP) . |
| 0 355 011 A2 | 2/1990 | (EP) . |
| 0 358 780 A1 | 3/1990 | (EP) . |
| 0 568 729 A2 | 11/1993 | (EP) . |
| 2 644 439 | 9/1990 | (FR) . |
| 63-263680 | 10/1988 | (JP) . |
| 63-271780 | 11/1988 | (JP) . |
| WO 93/16471 | 8/1993 | (WO) . |
| WO 95/05661 | 2/1995 | (WO) . |

* cited by examiner

Primary Examiner—David T. Fidei
(74) Attorney, Agent, or Firm—Gifford, Krass, Groh, Sprinkle, Anderson & Citkowski, P.C.

(57) ABSTRACT

An apparatus for the storage of disc sound and/or data carriers having a substantially rectangular flat housing that defines a receiving space that is accessible through a slot in one side of the housing. The housing also includes mutually oppositely disposed guide elements which receive a disc inserted through the slot and which keep it spaced from the housing surfaces. An ejection mechanism is mounted in the housing that includes a pivotally mounted lever arrangement. The ejection mechanism urges the disc through the slot such that it extends beyond the housing and may be grasped by a user. A braking and guide strip arrangement is provided in the flat housing adjacent to the slot opening. The strip arrangement extends over the width of the slot opening and includes at least two mutually and oppositely disposed strips. The spacing of the opposing strips is such that the center region of the slot opening has a spacing that is greater than the thickness of the disc. The spacing of the strips reduces towards the ends of the slot and is smaller in the region of the slot ends than the thickness of the disc.

13 Claims, 5 Drawing Sheets

DEVICE FOR STORING AUDIO MEDIA AND/OR DISK-SHAPED DATA MEDIA

BACKGROUND OF THE INVENTION

1. Field of the Invention

The invention relates to an apparatus for the storage of disc-like sound carriers and/or data carriers in the form of discs, in particular compact discs, wherein the carrier is of the type having a basic layout that includes a container with a recess arranged to receive a compact disc or similar object. The recess has a mouth opening through a sidewall of the container and an ejector for ejecting the object from the recess. See, for example, WO 93/16471.

2. Description of the Related Art

An apparatus of this kind has considerable advantages in comparison to the receiving containers for compact discs which are predominantly in use at the present time, both with respect to handling and also with respect to the space requirement, with respect to protection against damage and with respect to the cost and complexity of manufacture and also assembly.

BRIEF SUMMARY OF THE INVENTION

The object of the present invention is to further improve this storage apparatus and in particular to perfect it functionally, to minimize the manufacturing costs and to increase the scope of its application and uses.

The basic features of an apparatus suitable to satisfy this object for the storage of disc-like sound carriers and/or data carriers in the form of discs, in particular compact discs, are set forth in the claims.

Although the flat housing which accommodates all the functional elements only has a very low height, the data storage surfaces of the disc are ideally protected against damage, since the disc guides which are provided ensure that the surfaces to be protected do not come into contact with the flat housing or functional elements either in the storage position or during the insertion or removal process of the disc. This is, on the one hand, achieved by the consequential edge side guidance and holding of the disc via the functional elements, and, on the other hand, in that guide strips of curved extent are provided in the region of the insertion opening. These ensure that only an edge-wise contact can take place between the disc and the strips of curved extent during those phases in which the guide elements have not yet fully received the disc. In this way the data carrying surfaces of the disc are always spaced from all the mechanical components of the apparatus and are protected as well as possible.

The double utilization of the strip arrangement provided at the slot opening side is of particular advantage, since a braking function on removal of the floppy disc is satisfied by this strip arrangement in addition to the guidance and spacing function. Since the mutual spacing of the oppositely disposed strips is smaller in the region of the lateral slot ends than the material thickness of the respective disc, the desired braking function results during the ejection of the disc, and indeed in such a way that these braking strip regions in turn act at the data free edge region of the disc and, optionally together with additional braking elements which act at the peripheral side face of the disc, cause the disc to be so braked and brought to a standstill during the ejection process that at least a part region of its data free center area is disposed outside of the slot opening, so that it can be grasped manually and can thus be removed comfortably and without contacting the data carrying region.

An embodiment of the invention which is notable for its particular economy in manufacture is characterized in that one of the flat sides of the housing is provided at the end remote from the slot opening, with a cover surface attached to it in one part, in particular via film hinges, which can be pivoted over the other housing flat side while forming a flat spine part and can be fixed parallel to this other flat side of the housing. In this arrangement the inner side of the pivotable cover surface and/or the outer side of the flat housing side over which it engages is formed as a receiver for information carriers, in particular for booklets, such as are also used in customary CD packages. This solution which can be realized by injection molding at favorable cost, is basically also utilizable when double or multiple boxes are to be realized. Such double or multiple boxes are preferably constructed, having regard to achieving the highest degree of compactness, in such a way that the housing wall which accommodates the ejection mechanism and the pivotal guide levers, respectively forms a middle part or an inwardly disposed part and is exploited at the rear side as a cover wall for the flat housing lying beneath it. In order to enable an unhindered and individual ejection of the individually received discs, the actuating parts associated in this arrangement with the ejection mechanisms are alternately offset relative to one another and disposed in the housing corner regions lying remote from the slot opening.

A special feature important for the diversity of use of the apparatus of the invention lies in the fact that the flat housing forming the basic box is provided at the end face opposite to the slot opening with coupling elements, with a releasable connection of the respective basic box to carrier members having complementary coupling elements, or a connection not releasable without destruction, being possible via these coupling elements in a simple manner, in particular via snap/latch connections. Carrier members can, for example, be pivotal covers for receiving one or more flat housings, storage racks, display units, hanging depositories and the like.

BRIEF DESCRIPTION OF THE SEVERAL VIEWS OF THE DRAWINGS

Further particular advantageous embodiments of the invention are set forth in the subordinate claims and will be explained in the following description of embodiments with reference to the drawing; in the drawing there are shown:

DETAILED DESCRIPTION OF THE INVENTION

Figure 1:
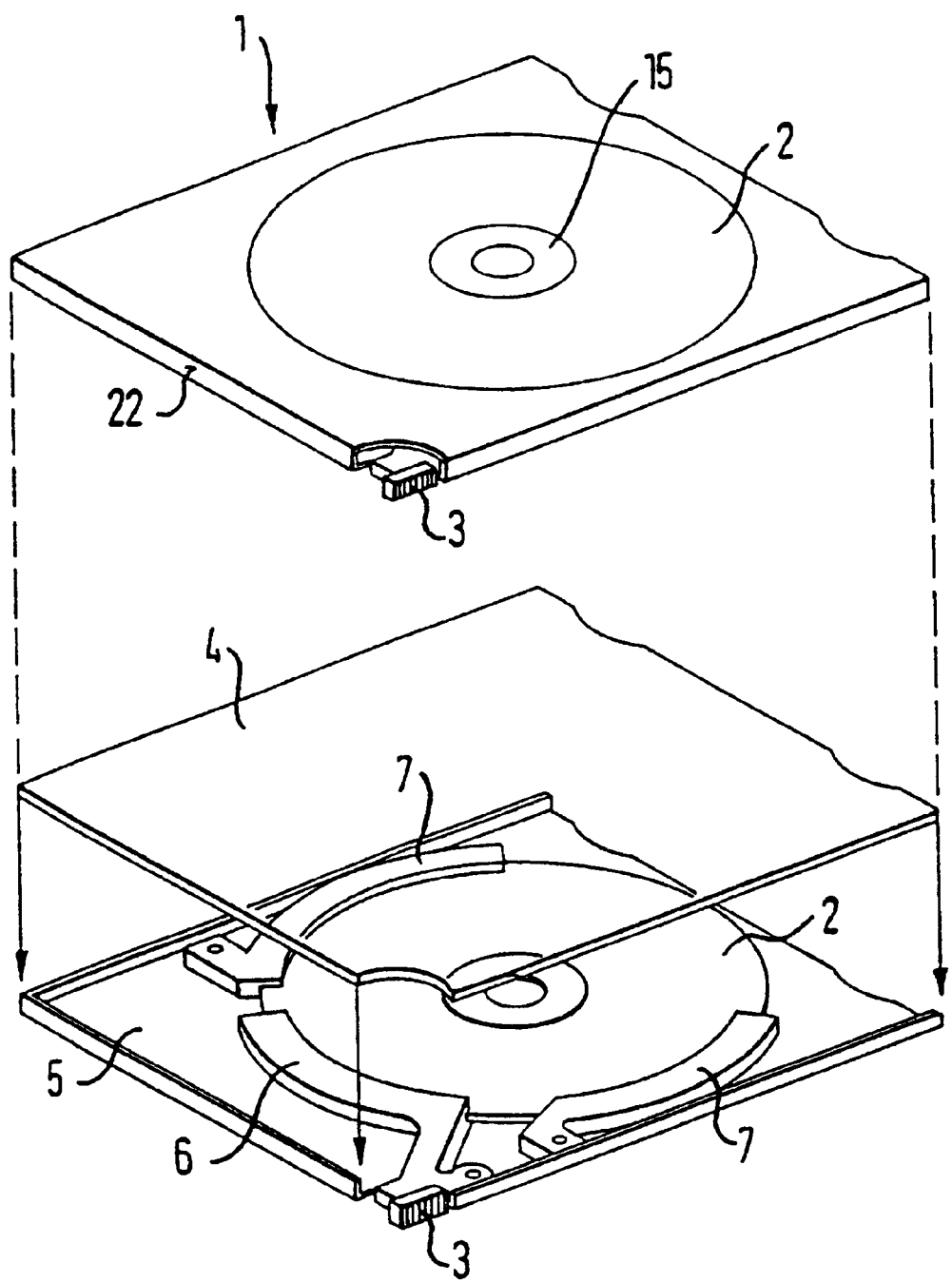
FIG. 1 a schematic perspective illustration of a flat basic box in the finished assembled state and also prior to the mounting of the cover part, FIG. 2 an enlarged partial view of a corner region of a basic box in the region of the slot opening, FIG. 3 a schematic part illustration of a peripheral braking device in the region of the slot opening of the basic box, FIG. 4 a schematic perspective illustration to explain the construction of a double box, FIG. 5 a schematic illustration of a basic box with an integrally molded on cover surface prior to the final assembly, FIG. 6 the embodiment of FIG. 5 in the finished state, FIG. 7 a schematic illustration to explain the coupling possibilities between a basic box and carrier elements, and FIG. 8 a schematic illustration to explain the coupling of a basic box to an outer package resembling a book cover.

FIG. 1 shows in the upper part a fully assembled flat housing 1, i.e. a basic box for receiving a disc 2, which has a respective large area data carrying region on the one side or on both sides and data free edge regions as well as a data free middle region 15. An actuating part 3 is located in a corner region of the basic box 1, which can be seen in detail in the illustration of the not yet finally assembled basic box. This illustration allows it to be seen that the basic box 1 includes a lower housing wall 5 and an upper housing wall 4, between which a receiving space for the disc 2 is provided after these two walls 4, 5 have been connected. The lower housing wall 4 and the upper housing wall 5 can in principle be connected to one another in any desired manner. Preferred are snap-latch connections, plug-in welded connections or adhesive connections.

Pivoting guide levers 7 for the disc 2 as wall as an ejection mechanism comprising an ejector part 6 and the actuating part 3 are provided at the lower housing wall 5. All these elements are executed in a flat manner of construction and preferably consist of a reusable material, in particular polypropylene, in just the same way as the two housing walls 4, 5. The actuating part 3 is pivotally mounted at the lower housing wall 5 and is formed in one piece with the part circular ejector part 6, which preferably has a receiving groove facing the disc 2 for the data-free disc edge. This receiving groove of U-shape can also be slightly divergingly formed towards the outside in order to promote the secure reception of the disc 2 in the groove. By pressing the actuating part 3, which is always disposed within the outline of the flat housing 1, the ejection process for the disc is brought about and, when a disc 2 is inserted into the flat housing 1, a return pivoting of the ejector part 6 into the position shown in FIG. 1 necessarily takes place, in which it also comes into contact with a corresponding abutment of the flat housing.

The lateral pivotal guide levers 7 are preferably held via a spigot axis with respect to the lower housing wall 5 and are so supported on the lower housing wall 5 via the pivot bearing side end that they can at least substantially not be pivoted in the direction of the center of the housing. These pivotal guide levers 7 consist of a flexible material and have guide grooves for the disc 2, so that the pivotal levers 7 engage over the data free edge of the disc when the disc 2 is inserted. The free ends of the pivotal levers 7 are preferably somewhat broadened, i.e. formed in funnel-like shape in order to ensure that the disc 2 passes during the insertion process into the corresponding guide grooves of the pivotal levers 7, even when the disc 2 is inserted into the guide slot not quite parallel to the flat housing plane.

The length of the pivotal guide levers 7 is so selected that, on the one hand, the respective disc 2 passes at the earliest possible time point into the guide grooves of the pivotal guide levers 7 during the insertion process, and, on the other hand, that an automatic entry effect is obtained which results from the fact that as a result of the elastic resetting force of the pivotal levers, which are initially brought into an extended position during the disc insertion process, the disc is practically compulsorily drawn into the housing after a specific degree of insertion and thus brought into the ideally protected position.

Figure 2:
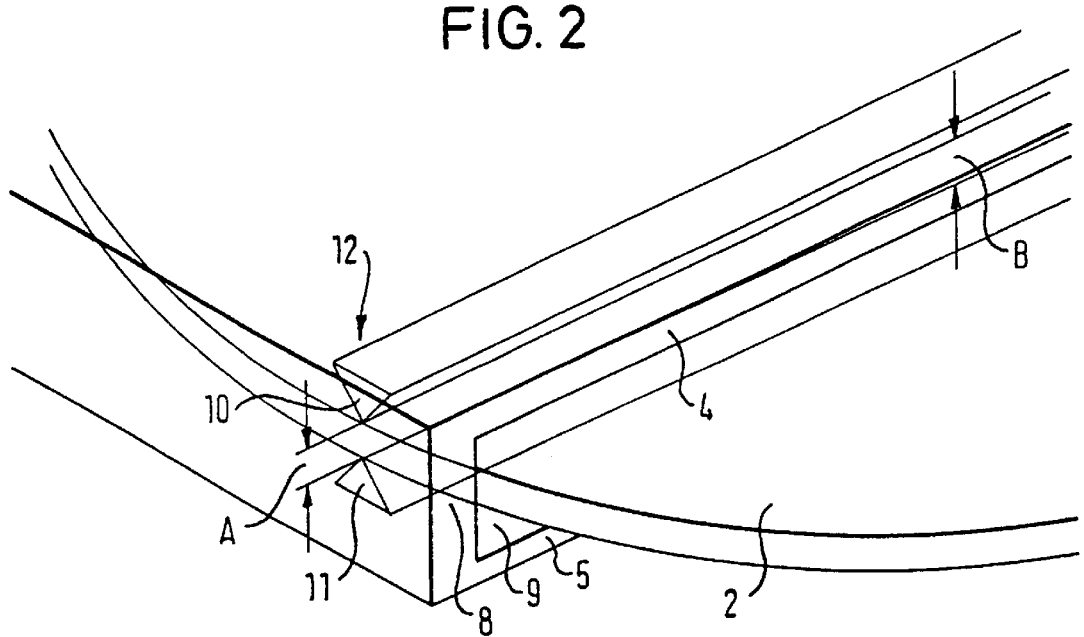

FIG. 2 shows a corner region of the basic box 1 at the side of the slot opening, i.e. in each case a part of the lower housing wall 5 and of the upper housing wall 4, between which the lateral housing wall 8 extends, this wall being formed, as a rule, by corresponding projections of the upper and lower housing walls, with the slot opening 9 being defined for the reception of the disc 2.

An upper strip 10 and a lower strip 11 respectively extend over the full width of opening of the slot at a small spacing from the slot opening 9, the strips being of triangular shape in cross-section, with their apexes lying opposite to one another. Through these strips 10, 11 a braking region 12 is provided adjacent to the lateral housing wall 8, since in this region the mutual spacing of the strips 10, 11 is somewhat smaller than the thickness of the discs 2. Towards the center of the slot opening 9 the spacing between the strips 10, 11 increases to a value which is larger than the thickness of the disc 2, and this distance reduces again in an analogous manner towards the oppositely disposed lateral housing wall.

Through this design a situation is above all achieved, in addition to the provision of lateral braking regions 12, in which the disc 2 is always guided at its data free edges right at the start of the insertion into the slot opening 9, and thus any contact of data carrying regions by any components of the basic box is precluded.

The dimension B is thus so selected that it is only fractionally larger than the material thickness of the disc 2 and its dimension reduces to the lateral housing walls 8 continuously in such a way that an undersize A with respect to the disc 2 is first achieved in the braking region 12.

Figure 3:
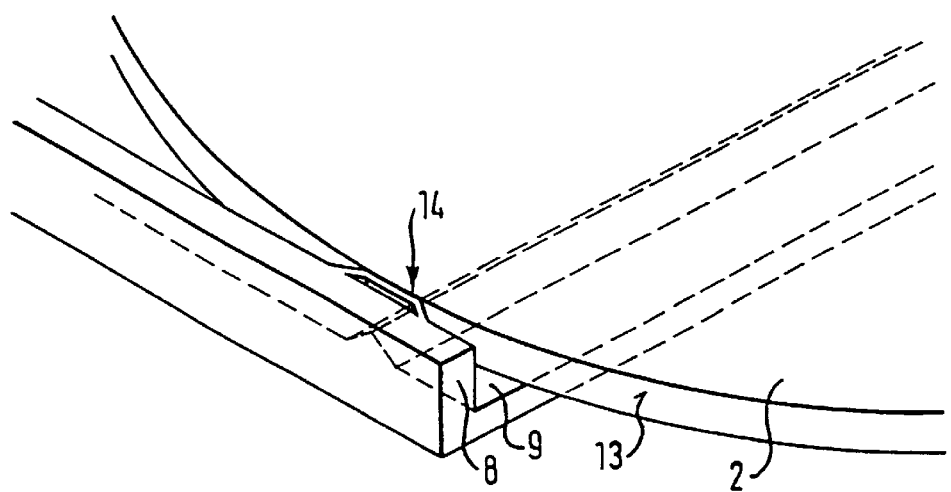

FIG. 3 shows one brake element 14 of brake elements provided at both sides in the region of the slot opening 9, which are present in the form of an elastic spring element, preferably formed in one piece with the lateral housing wall 8, and which act on the peripheral side face 13 of the disc 2. Such peripheral braking elements 14 can be provided either alone or preferably in combination with the braking regions explained in connection with FIG. 2.

Figure 4:
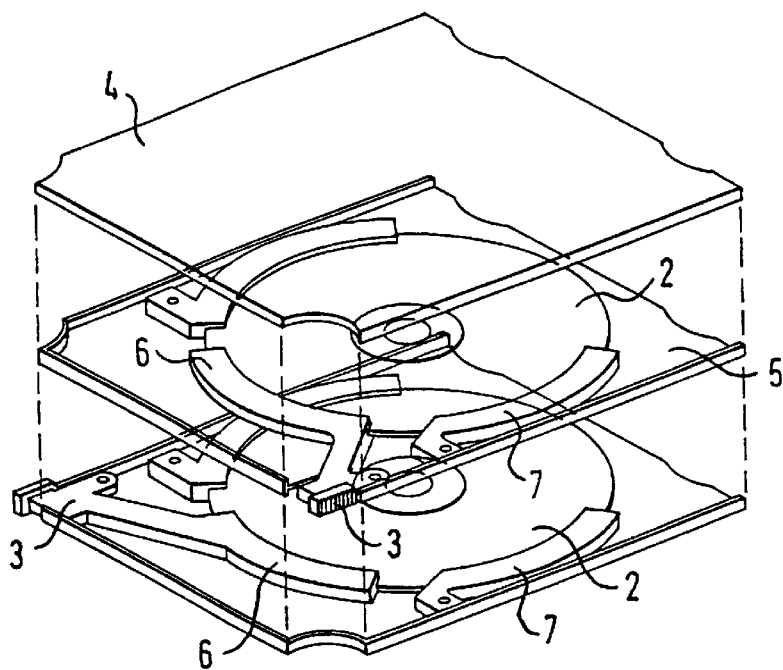

FIG. 4 shows the basic layout of a double or multiple box arrangement. The basic principle of the layout already explained with respect to FIG. 1 remains unchanged but a particularly compact, narrow construction is realized by the special design of the centrally or inwardly disposed part which is respectively formed by a lower housing wall 5, and a high economy is achieved by double utilization of this housing wall 5.

For this purpose, this housing wall 5, which has the ejection mechanism 3, 6 and the pivotal guide levers 7, is formed at the rear side as a cover wall for the respective flat housing lying below it and the actuating parts 3 associated with the ejection mechanisms are alternately mutually offset in the housing corner regions lying remote from the slot opening 9. Thus, the actuating parts 3 can be individually actuated without mutual hindrance both in a double box and also in a multiple box.

Figure 5:
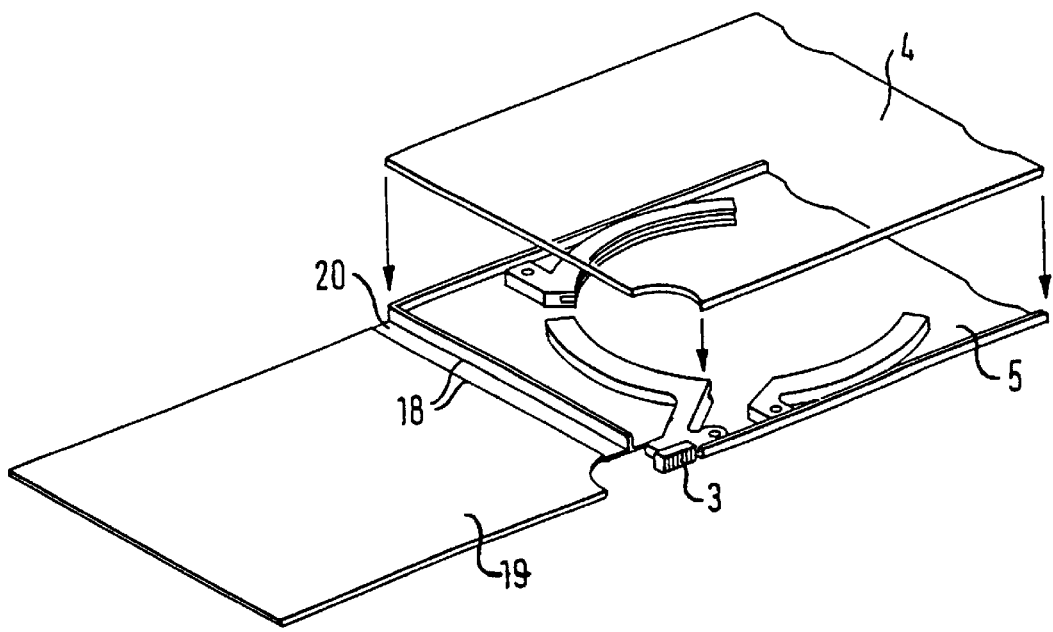

FIG. 5 shows a particularly important embodiment both with regard to the simplicity of the total layout and also to economical manufacture, which is suitable both for a single box and also for a double box or multiple box.

In accordance with this embodiment, one of the flat sides of the housing, in particular the lower flat side 5 of the housing, is provided at the end remote from the slot opening 9, with a cover surface 19 attached in one piece via film hinges 18, so that an arrangement resembling a book cover is obtained via the flat spine part 20 defined by two film hinges 18. This arrangement can be realized at favorable cost as a result of the one piece design of the lower housing wall 5 and cover surface 19 and opens up the possibility, via the cover surface 19 and the flat spine part, of providing a structure corresponding to customary disc receiving containers with a pivoted lid hinged via hinge connections, which makes it possible in simple manner to provide receiving regions for word and image representations on inserted sheets or inserted cards and also for information brochures, in particular in booklet form.

Figure 6:
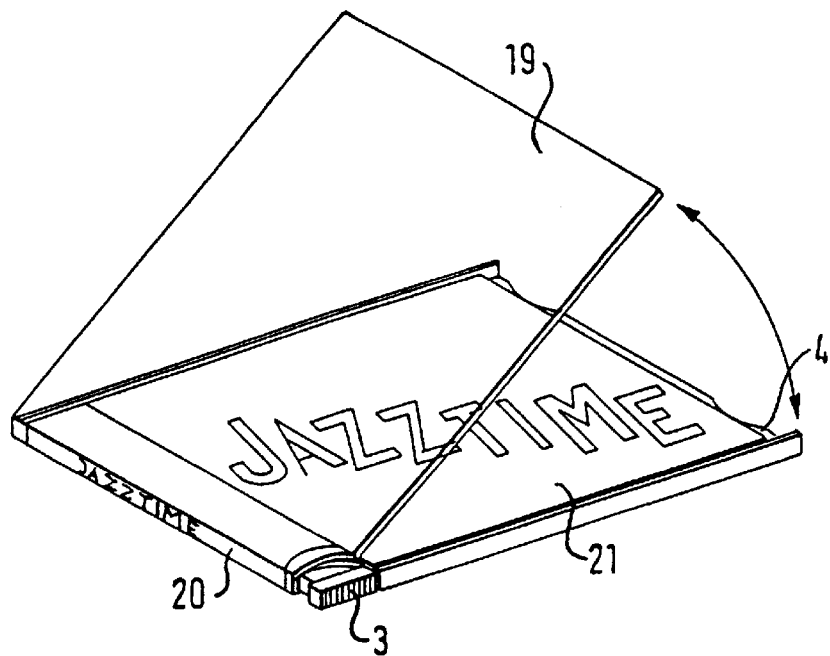

FIG. 6 shows the arrangement of FIG. 5 in the finished, assembled form, in which it is evident that the required freedom of movement for the actuating part 3 is provided through corresponding cutouts in the lower housing wall 5 and in the cover surface 19 and that the flat spine part 20 can be utilized by the insertion of correspondingly printed sheets as a visible information side, whereas the top side of the cover part 4 or the inwardly disposed side of the cover surface 9 can be formed as a receiving region for an information brochure or a booklet 21. Simple and also easily releasable fixing means can be provided between the cover surface 9 and the upper housing wall 4, in order to enable a pivotal opening of the cover surface 19 and thus access to the respective information brochure 21. It is, however, important that, in comparison to customary CD packages, no form of pivoting opening processes are required when the CD is to be removed from the basic box or inserted into the basic box.

Figure 7:
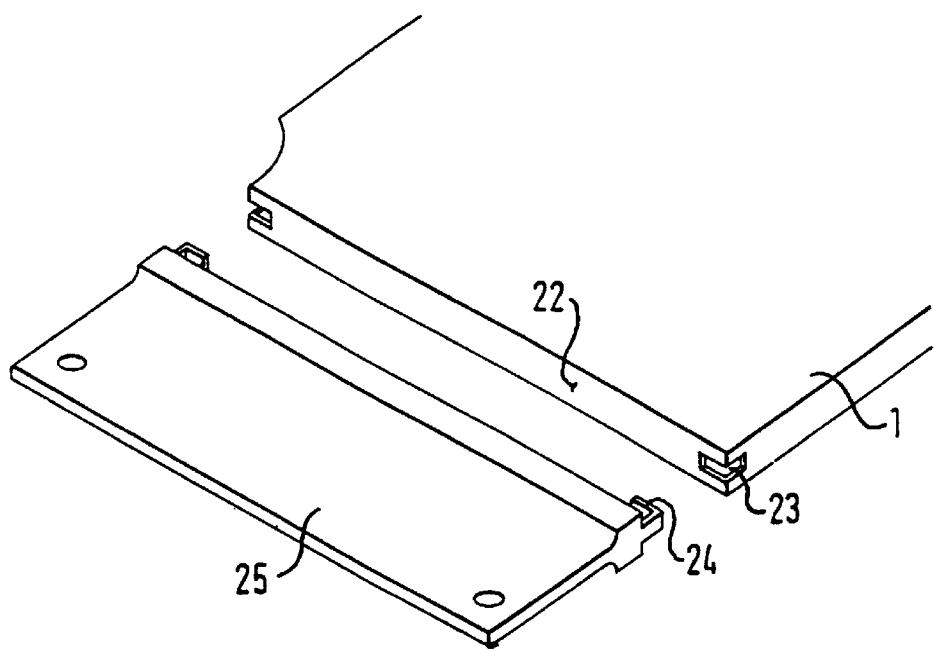

FIG. 7 shows a possibility, important in practice, of coupling a basic box 1 to a carrier member 25.

For this purpose the end face 22 of the basic box 1 is provided with coupling elements, in particular cutouts 23, which are already provided during the manufacture and which permit a stable, releasable connection to a carrier member 25, or a connection which is not releasable free of destruction. Different shapes can be considered as a carrier member 25. FIG. 7 shows a design resembling a filling strip, which permits retention in Leitz files or in corresponding rail arrangements. A design for use in hanging depositories is possible in the same manner. Moreover, the carrier member can be so designed that a plug-in or coupling reception is possible in storage racks or display units. Basically an adaptation to any desired known systems can take place through this coupling possibility.

Figure 8:
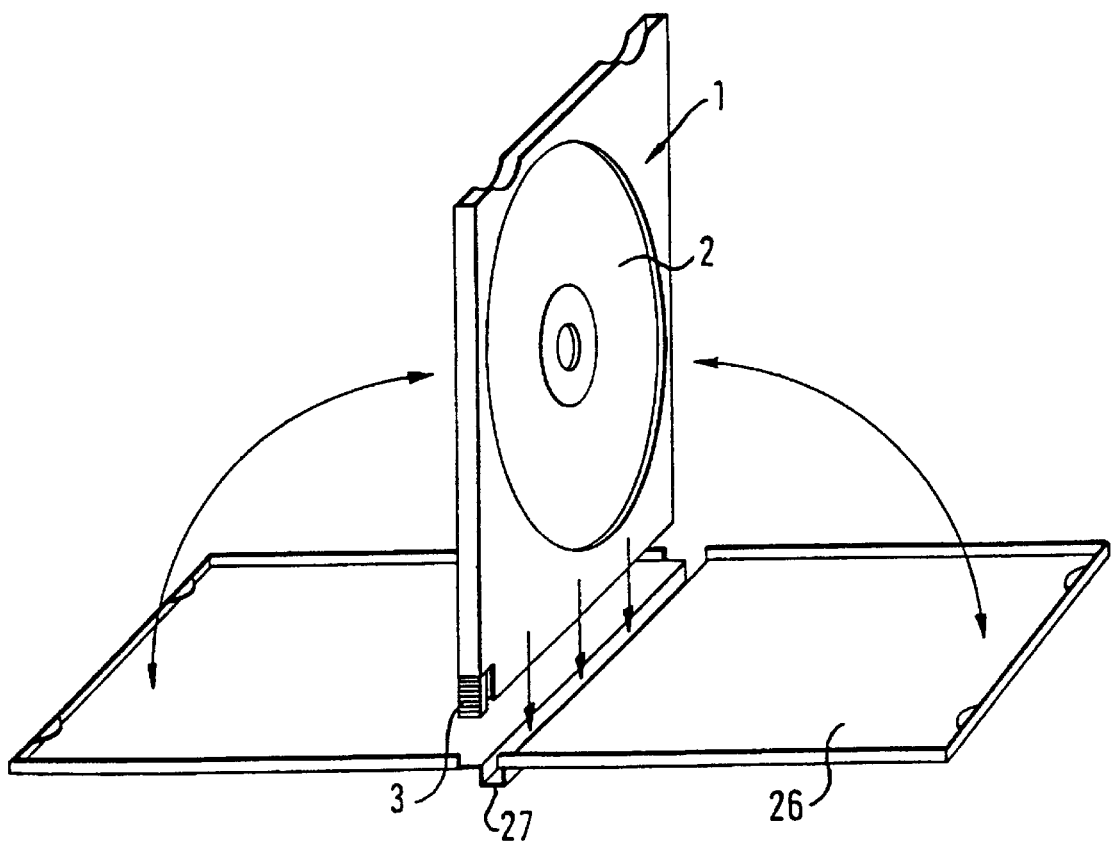

FIG. 8 shows an example for the reception of the basic box 1 in the spine part 27 of a book-like pivoted lid arrangement, in which both pivoted lids can be formed to receive accompanying enclosures. The connection of the basic box 1 to the pivoted lid arrangement could admittedly take place by forming the mount 27 as a clamping mount. However, the coupling principle explained with respect to FIG. 7 is preferably also used here. The pivoting lid arrangement permits in turn a simple one-piece manufacture of suitable material, in particular of transparent material, so that both the spine part 27, which has a cutout for the free handling of the actuating part 3, and also the surfaces of the pivotal lid, can be exploited as a display region, and it is likewise possible to use the information booklets customary in known CD packages without changing them.

All embodiments of the invention are characterized by their simplicity, compactness, problem-free operability and high additional utilization both with respect to the display possibilities, with respect to disc protection and by extensive additional uses with respect to the practical usage.

What is claimed is:

1. Apparatus for the storage of disc sound carriers and/or data carriers in the form of discs, in particular compact discs, the apparatus comprising:

a substantially rectangular flat housing, said housing having wall surfaces, and at least one narrow side in which there is formed a receiving space accessible via a slot opening defined in said narrow side of the housing, said slot opening having a first and second end;

mutually oppositely disposed guide elements positioned within said housing receiving space, said guide elements receiving a disc inserted through said slot opening and keep said disc spaced apart from the housing wall surfaces parallel to the plane of the disc, said guide element being formed as at least substantially part circularly shaped pivotal levers of flexible material, which can be transferred by the disc in extended position;

an ejection mechanism mounted in the housing at the rear side opposite to the slot opening, said ejection mechanism comprising;

a pivotally mounted lever arrangement having an actuating part freely accessible from outside the housing in a housing comer region, said level arrangement being movable within the outline of the flat housing, and an ejector part which extended into the receiving space, said ejector part acting at the outer periphery of the disc and being movable between a first position in which the disc is located in a storage position within the receiving space and a second position in which the disc adopts a removal position with at least a part region of a data free central region of said disc is manually graspably disposed outside of the slot opening;

a braking and guide strip arrangement mounted in the flat housing adjacent to the slot opening, said arrangement extending over the width of the slot opening and comprising of at least two, mutually oppositely disposed strips, said strips having a mutual spacing in a center region of the slot opening which is greater than the material thickness of the disc and a mutual spacing that reduces towards said ends of the slot opening, and is smaller in the region of the ends of the slot opening than the material thickness of the disc.

2. The apparatus in accordance with claim 1, characterized in that the oppositely disposed strips are at least substantially triangularly shaped in cross-section and are disposed with their apexes opposite to one another.

3. The apparatus in accordance with claim 1, further comprising a resilient brake element, said brake element formed integrally with the housing in the region of the slot opening at the narrow side of the housing and acting at a peripheral end face of the disc.

4. The apparatus in accordance with claim 1, characterized in that said guide elements have at ends directed towards the slot opening a broadened receiving and capture section for the disc to be supplied.

5. The apparatus in accordance with claim 1, characterized in that said guide elements are journalled on spigots fixed relative to the housing, are guided between the upper and lower housing walls and are held in their basic position by an abutment fixed to the housing.

6. The apparatus in accordance with claim 1, further comprises for the formation of a double box or a multiple box a housing wall having a second ejection mechanism and guide elements forms a middle part and is formed at as a cover wall for the flat housing lying beneath it, and in that a pivotally mounted lever associated with the ejection mechanisms are alternately offset relative to one another and arranged in the housing corner regions remote from the slot opening.

7. The apparatus in accordance with claim 1, characterized in that one of the wall surfaces of the housing is provided at the end remote from the slot opening with a cover surface attached to it via a film hinge, said cover being pivotable over the a second wall surface and having a flat spine part and being adapted for releasable attachment to said housing.

8. The apparatus in accordance with claim 7, wherein said cover comprises an inner side of a pivotal cover surface and said second wall surface of the housing over which said cover engages is form as a receiving space for information carriers, in particular booklets.

9. The apparatus in accordance with claim 7, characterized in that the height of the flat spine part determined by the position of the film hinges is freely selectable and adaptable to a double or a multiple box.

10. The apparatus in accordance with claim 1, wherein the housing forms a box having an end face opposite to the slot opening, said end face having coupling elements in the form of recesses, said housing adapted to be connected via said coupling elements to carrier members, pivotal sleeves, outer packagings, hanging depositories, storage racks or display units.

11. The apparatus in accordance with claim 10, further comprising snap/latch connections in releasable form or in a form which cannot be released without destruction.

12. The apparatus in accordance with claim 1, wherein said housing further comprises an opening adapted to receive a blocking member which blocks the ejection mechanism.

13. The apparatus in accordance with claim 1, characterized in that all the components are constructed from polypropylene.

* * * * *